US010999232B2

(12) United States Patent
Delaney et al.

(10) Patent No.: US 10,999,232 B2
(45) Date of Patent: May 4, 2021

(54) ADAPTIVE NOTIFICATION

(71) Applicant: LENOVO (Singapore) PTE. LTD., New Tech Park (SG)

(72) Inventors: Mark Patrick Delaney, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/284,591

(22) Filed: Feb. 25, 2019

(65) Prior Publication Data
US 2020/0274842 A1    Aug. 27, 2020

(51) Int. Cl.
*H04L 12/58*         (2006.01)

(52) U.S. Cl.
CPC .............. *H04L 51/24* (2013.01); *H04L 51/26* (2013.01)

(58) Field of Classification Search
CPC ................................................ H04L 51/24–26
USPC .......................................... 709/206–208, 217
See application file for complete search history.

(56) References Cited

U.S. PATENT DOCUMENTS

| 5,664,126 A * | 9/1997 | Hirakawa | H04L 29/12009 |
| | | | 707/999.01 |
| 10,404,740 B2 * | 9/2019 | Stolarz | H04L 63/1441 |
| 2016/0191437 A1 * | 6/2016 | Thomas | H04W 4/12 |
| | | | 709/206 |
| 2017/0359277 A1 * | 12/2017 | Snider | H04L 51/02 |
| 2018/0006979 A1 * | 1/2018 | Barsness | H04L 51/063 |

OTHER PUBLICATIONS

Thelwall, Mike, Kevan Buckley, Georgios Paltoglou, Di Cai, and Arvid Kappas. "Sentiment strength detection in short informal text." Journal of the American Society for Information Science and Technology 61, No. 12 (2010): 2544-2558. (Year: 2010).*

\* cited by examiner

*Primary Examiner* — Suraj M Joshi
*Assistant Examiner* — Melaku Y Habtemariam
(74) *Attorney, Agent, or Firm* — Kunzler Bean & Adamson (57) ABSTRACT

For adaptive notification, a processor determines a message sentiment of a message. The processor further determines a sender relationship of a sender of the message to a recipient. The processor determines a notification urgency for the message to the recipient from a notification model based on the message sentiment and the sender relationship. The processor communicates a notification of the message to the recipient based on the notification urgency.

20 Claims, 13 Drawing Sheets

201

| Message |
| :---: |
| 131 |

| Notification Urgency |
| :---: |
| 231 |

| Message Sentiment |
| :---: |
| 233 |

| Received Time Stamp |
| :---: |
| 235 |

| Reply Time Stamp |
| :---: |
| 237 |

| Reply Message |
| :---: |
| 239 |

| Reply Sentiment |
| :---: |
| 241 |

| Urgency Feedback |
| :---: |
| 133 |

| Message 131 | Message Frequency 303 | Sender Relationship 219 | Message Sentiment 233 | Relationship Score 305 | Frequency Score 307 | Notification Urgency 231 | Notification 309 |
|---|---|---|---|---|---|---|---|
| Can't wait to see you this weekend! | 1 | Mother | 0.15 | 0.99 | 0.5 | 0.074 | Silent |
| Did I leave my cooler on your deck? | 1 | Friend | 0.38 | 0.6 | 0.5 | 0.114 | Subtle Vibrate |
| This will bring down your credit score! Bit.ly/3421.com | 1 | Random Num | 0.71 | 0.1 | 0.5 | 0.036 | Silent |
| I need YtY past due ASAP for our CFO. Can you send ?! | 2 | Coworker | 0.76 | 0.4 | 0.7 | 0.213 | Firm Vibrate |
| Call me immediately. We have a family issue. | 3 | Brother | 0.99 | 0.99 | 0.9 | 0.882 | Vibrate and Ring |

| Thresholds | |
|---|---|
| Notification Urgency Range | Notification 309 |
| 0-0.10 | Silent |
| 0.11-0.2 | Subtle Vibrate |
| 0.21-0.5 | Vibrate |
| 0.51-0.84 | Muted Ring |
| 0.85-0.99 | Vibrate and Ring |

ADAPTIVE NOTIFICATION

FIELD

The subject matter disclosed herein relates to adaptive notification and more particularly relates to adaptive notification of messages.

BACKGROUND

A user may be notified when an electronic device receives a message.

BRIEF SUMMARY

An apparatus for adaptive notification is disclosed. The apparatus includes a processor and a memory. The memory stores code executable by the processor. The processor determines a message sentiment of a message. The processor further determines a sender relationship of a sender of the message to a recipient. The processor determines a notification urgency for the message to the recipient from a notification model based on the message sentiment and the sender relationship. The processor communicates a notification of the message to the recipient based on the notification urgency. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
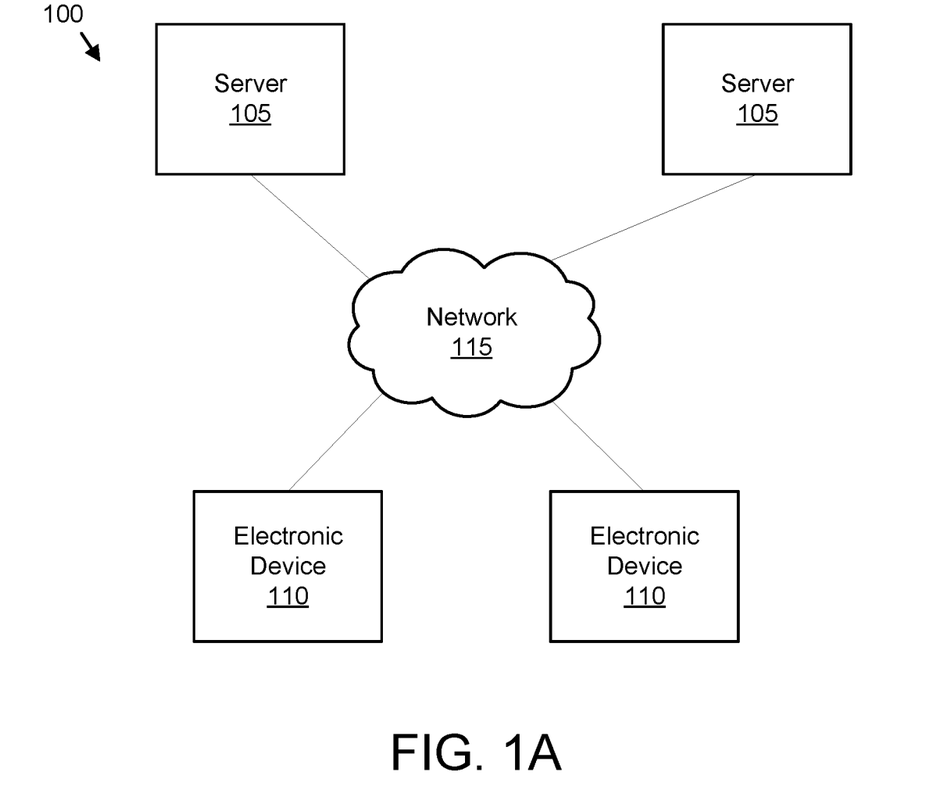
FIG. 1A is a schematic block diagram illustrating one embodiment of an adaptive notification system.

FIG. 1A is a schematic block diagram illustrating one embodiment of an adaptive notification system 100. The system 100 may adaptively notify an electronic device 110 of a message. In the depicted embodiment, the system 100 includes one or more servers 105, a network 115, and one or more electronic devices 110. The servers 105 may communicate with the electronic devices 110 through the network 115. The network 115 may be the Internet, a mobile telephone network, a Wi-Fi network, a local area network, a wide-area network, or combinations thereof.

The one or more servers 105 and/or electronic devices 110 may send messages to a given electronic device 110. The messages may be personal communications, notices of actions, subscription information, and the like. A user of the electronic device 110 may wish to know immediately of some of the messages, while other messages are less urgent. The embodiments determine a notification urgency for the message based on a message sentiment and a sender relationship between a sender of the message and a recipient of the message. In addition, the embodiments communicate a notification of the message to the recipient via the electronic device 110 based on the notification urgency. As a result, the recipient receives timely and noticeable notification of urgent messages while the notifications for less urgent messages are proportionately less timely and/or less noticeable. Thus, the embodiments improve the functioning of the electronic device 110 in providing notifications to the recipient as will be described hereafter.

Figure 1B:
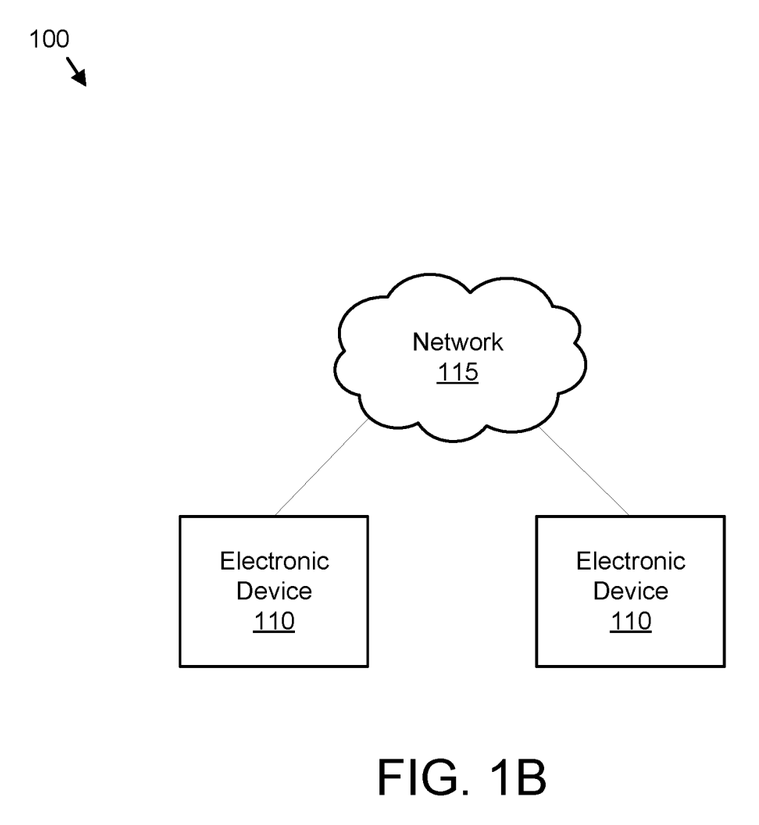
FIG. 1B is a schematic block diagram illustrating one alternate embodiment of an adaptive notification system.

FIG. 1B is a schematic block diagram illustrating one alternate embodiment of an adaptive notification system 100. In the depicted embodiment, electronic devices 110 communicate directly through a network 115.

Figure 2A:
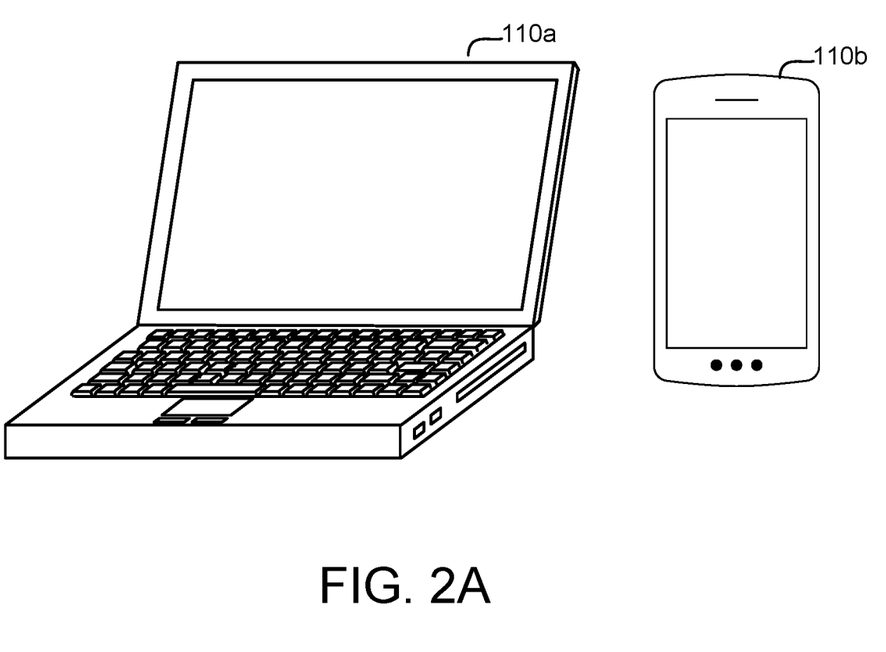
FIG. 2A is a drawing illustrating one embodiment of electronic devices.

FIG. 2A is a drawing illustrating one embodiment of electronic devices 110. In the depicted embodiment, a laptop electronic device 110a and a mobile telephone electronic device 110b are shown. A notification of a message may be communicated through the electronic device 110 via a presentation on a screen, an audible communication, a vibration, and the like.

Figure 2B:
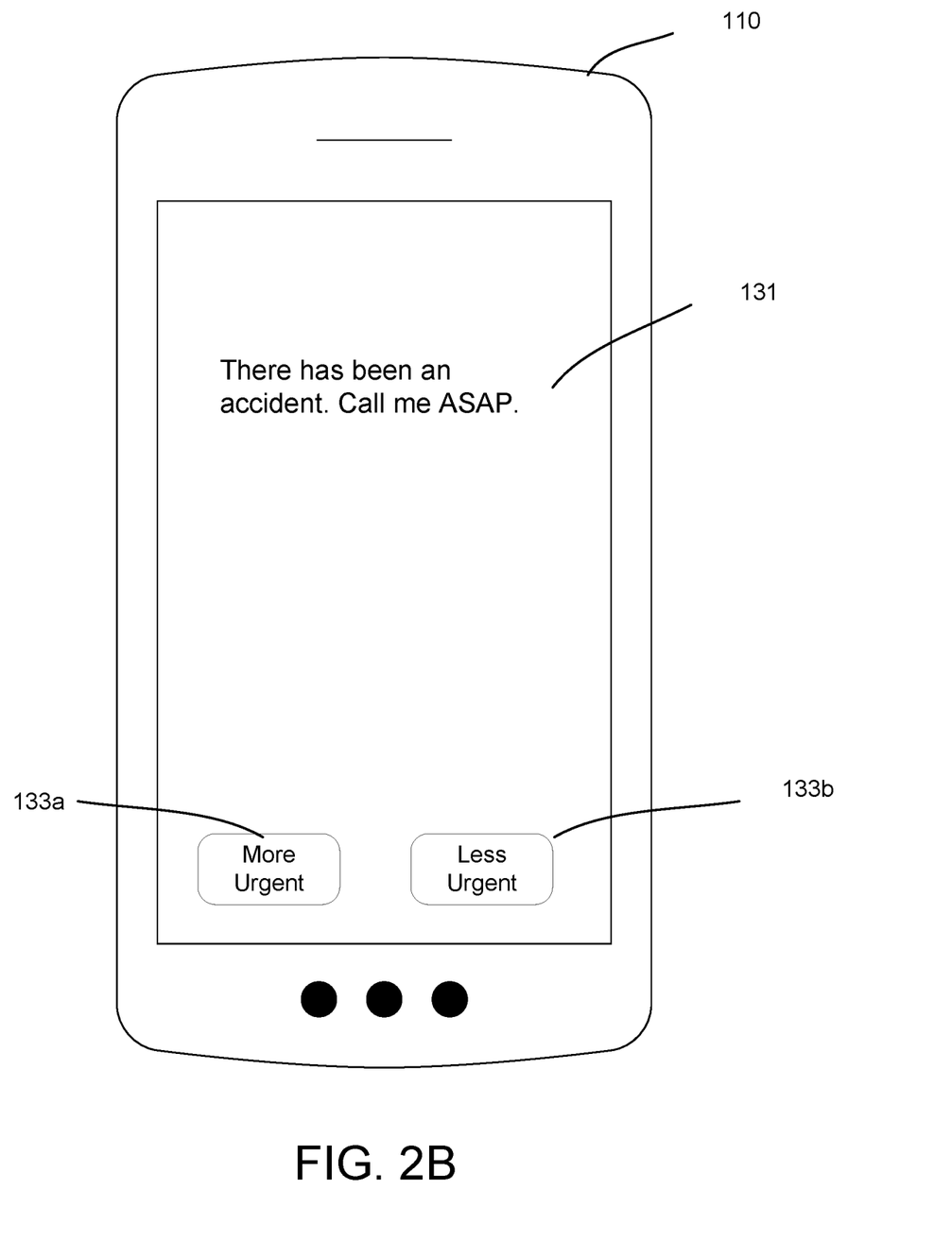
FIG. 2B is a drawing illustrating one embodiment of urgency feedback.

FIG. 2B is a drawing illustrating one embodiment of urgency feedback 133. In the depicted embodiment, a message 131 is displayed on the electronic device 110. The recipient may provide urgency feedback 133 by selecting one of a more urgent urgency feedback 133a and a less urgent urgency feedback 133b. The urgency feedback 133a-b may indicate that a notification of the message 131 should have been more urgent or less urgent. The urgency feedback 133a-b may be used to train a notification model as will be described hereafter.

Figure 3A:
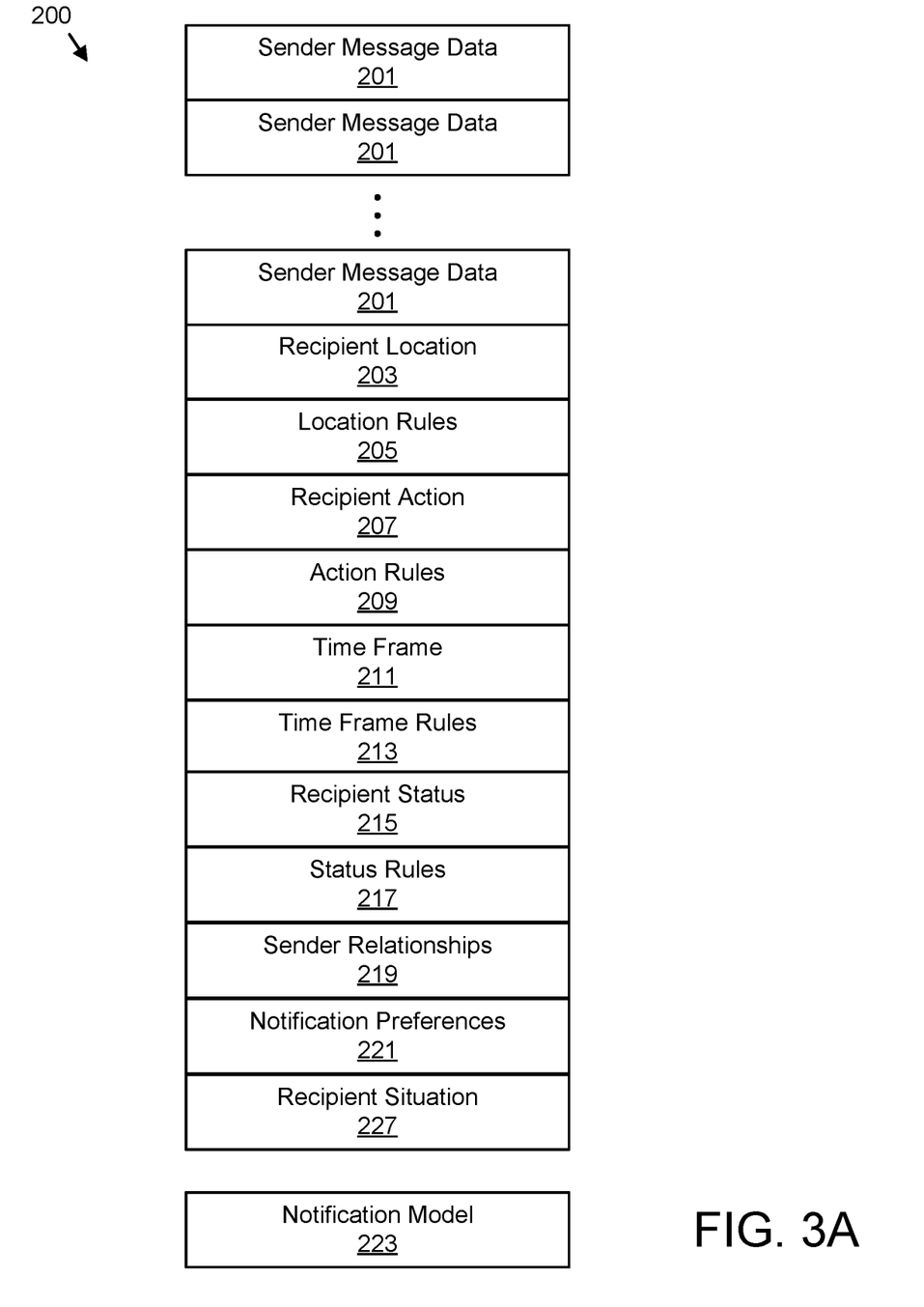
FIG. 3A is a schematic block diagram illustrating one embodiment of notification data.

FIG. 3A is a schematic block diagram illustrating one embodiment of notification data 200. The notification data 200 maybe organized as a data structure in a memory. In the depicted embodiment, the notification data 200 includes a plurality of sender message data 201, a recipient location 203, location rules 205, a recipient action 207, action rules 209, a timeframe 211, timeframe rules 213, a recipient status 215, status rules 217, sender relationships 219, notification preferences 221, and a recipient situation 227. In addition, the notification data 200 includes a notification model 223.

The sender message data 201 records information associated with each message 131 communicated to an electronic device 110. The sender message data 201 is described in more detail in FIG. 3B.

The recipient location 203 records a location of the electronic device 110 and/or the recipient associated with the electronic device 110. The recipient location 203 may comprise Global Positioning System (GPS) coordinates. In addition, the recipient location 203 may comprise a network node identifier and network node location. In one embodiment, the recipient location 203 includes a location of the recipient relative to the electronic device 110. A camera of the electronic device 110 may determine the location of the recipient relative to the electronic device 110.

The location rules 205 may specify types of notifications for specified locations. For example, the location rules 205 may specify a silent notification when the recipient location 203 is a theater.

The recipient action 207 may record a current action of the recipient. Actions may include walking, driving, conversing, listening, talking, and the like. The electronic device 110 may determine the current action of the recipient based on inputs to a microphone of the electronic device 110, inputs to a camera the electronic device 110, accelerations measured by an accelerometer of the electronic device 110, and the like.

The action rules 209 may specify types of notifications for specified actions. For example, the action rules 209 may specify that most notifications are silent when the recipient is driving.

The time frame 211 may specify a current time frame for the recipient. In one embodiment, the time frame 211 includes a plurality of time intervals labeled as one or more of sleeping, preparation, working, traveling, eating, relaxing, participating, and the like. The timeframe rules 213 may specify types of notifications for the specified time intervals. For example, the timeframe rules 213 may specify that most notifications are silent during a sleeping time interval.

The recipient status 215 may record a current status of the recipient. In one embodiment, the recipient status 215 is determined from an electronic calendar, a declared status, and the like. For example, if the electronic calendar indicates that the recipient is in a meeting, the recipient status 215 may be busy. Similarly, if the electronic calendar indicates that the recipient is not participating in an organized activity, the recipient status 215 may be free. The recipient may also declare that she is free or busy.

The status rules 217 may specify types of notifications for each recipient status 215. For example, the status rules 217 may specify that most notifications are silent when the recipient is busy.

The sender relationships 219 may specify a formal relationship between each sender and the recipient. Sender relationships 219 may include parent, sibling, child, spouse, relative, neighbor, friend, employer, subordinate, and the like.

The notification preferences 221 may record the recipients preferences for various notifications. The notification preferences 221 may include a minimum alert volume, a maximum alert volume, a preferred alert volume, one or more alert tones, one or more alert tunes, a minimum alert duration, a maximum alert duration, a preferred alert duration, a minimum vibration intensity, a maximum vibration intensity, a preferred vibration intensity, a minimum vibration duration, a maximum vibration duration, a preferred vibration duration, and the like.

The recipient situation 227 may be calculated as a function of the recipient location 203, the recipient action 207, the time frame 211, and the recipient status 215. The recipient situation 227 may be determined by a neural network.

The notification model 223 may determine the notification urgency for a message. In one embodiment, the notification model 223 may comprise one or more trained neural networks. In addition, the notification model 223 may comprise one or more algorithms.

Figure 3B:
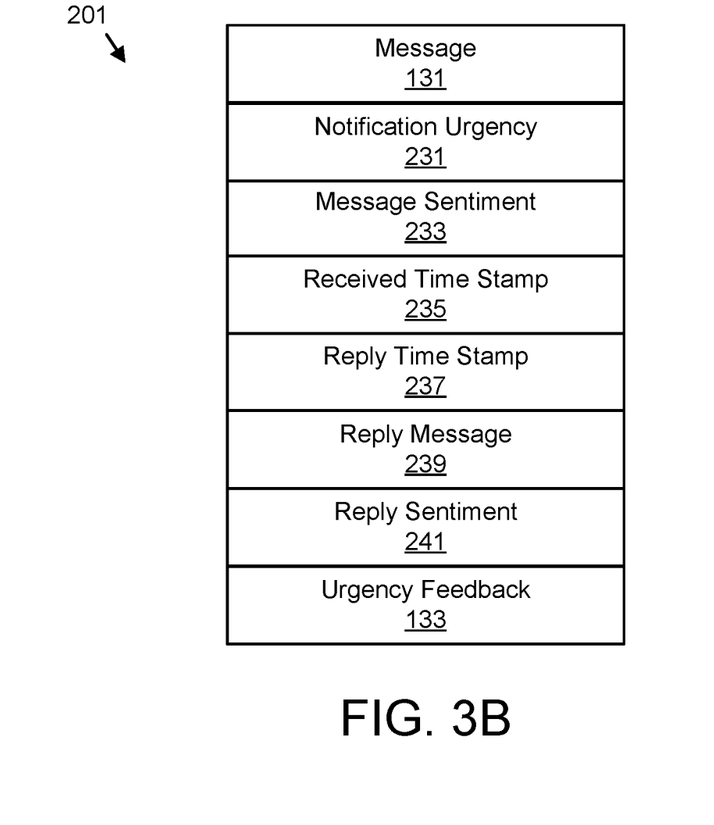
FIG. 3B is a schematic block diagram illustrating one embodiment of sender message data.

FIG. 3B is a schematic block diagram illustrating one embodiment of the sender message data 201. In the depicted embodiment, the sender message data 201 includes the message 131, the notification urgency 231, a message sentiment 233, a received time stamp 235, a reply time stamp 237, a reply message 239, a reply sentiment 241, and the urgency feedback 133.

The message 131 may be a text message, a graphical message, an audio message, a video message, or combinations thereof. The notification urgency 231 describes how the notification that announces the message 131 to the recipient via the electronic device 110 is communicated. The notification urgency 231 may specify one or more of an alert volume, an alert tone, an alert tune, an alert duration, a vibration intensity, and a vibration duration.

The message sentiment 233 may score characteristics of the message 131 including tone, affection, urgency, familiarity, and the like. The message sentiment 233 may be determined from using algorithm and/or neural network.

The received timestamp 235 indicates when the message 131 is received at the electronic device 110 and/or server 105. The reply timestamp 237 records when the reply message 239 replying to the message 131 is sent from the electronic device 110. The reply sentiment 241 may score sentiment characteristics of the reply message 239 and is similar to the sentiment 233.

The urgency feedback 133 records whether the recipient felt the notification urgency 231 of the notification should have been more urgent, neutral, or less urgent. The urgency feedback 133 is recorded after the recipient views the message 131 as shown in FIG. 2B.

Figure 3C:
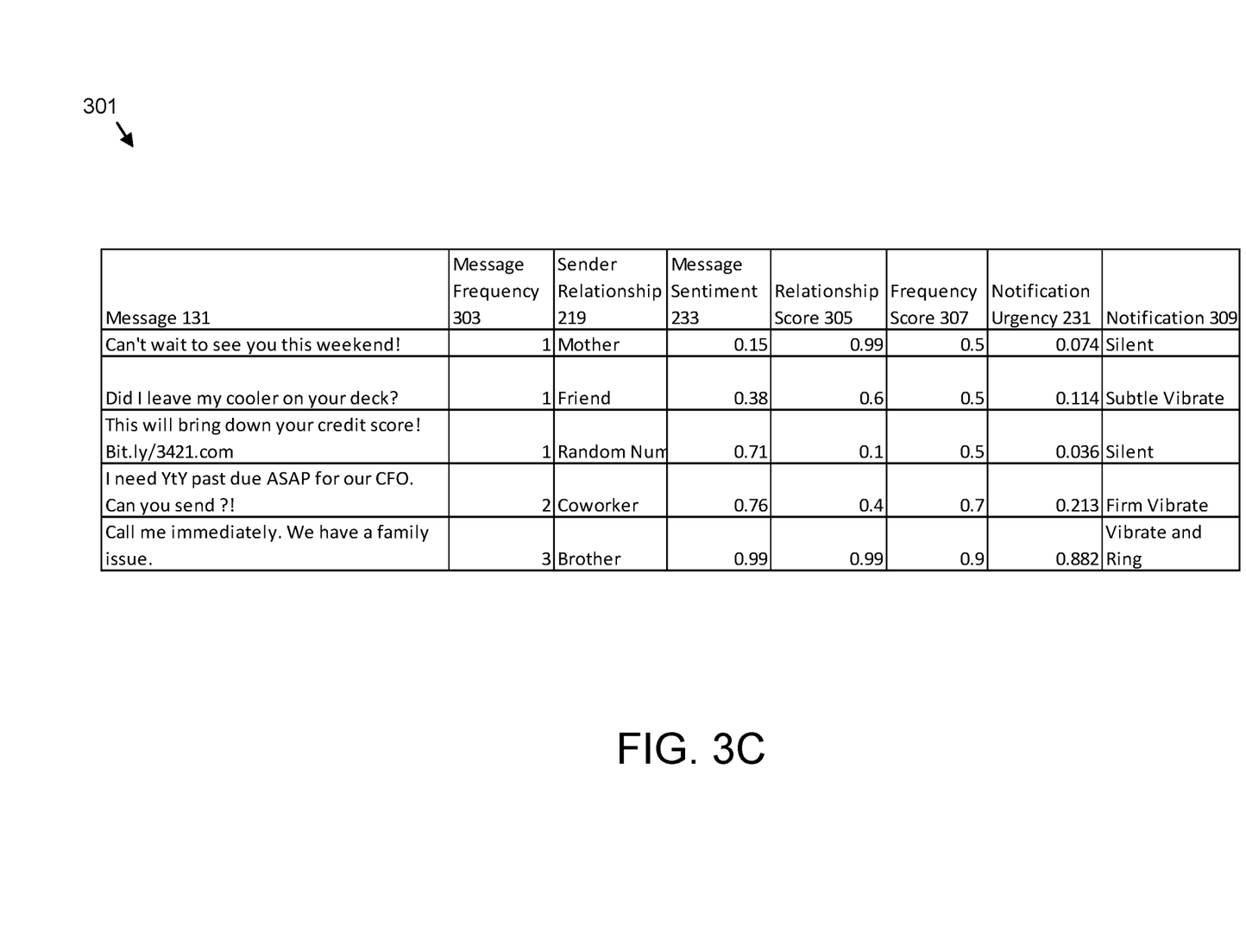
FIG. 3C is a table illustrating one embodiment of notification urgency data.

FIG. 3C is a table illustrating one embodiment of notification urgency data 301. The notification urgency data 301 may be organized as a data structure in a memory. The notification urgency data 301 maybe organized as a data structure in a memory. A plurality of exemplary messages 131 are shown. For each message 131, a message frequency 303 is calculated from the sender message data 201. In addition, the sender relationship 219 of the sender is determined for each message 131. The message sentiment 233 for each message is further determined.

In one embodiment, a relationship score 305 is calculated based on the sender relationship 219. The relationship score 305 may be a function of the sender relationship 219. In addition, the relationship score 305 may be a function of the sender relationship 219, the message frequency 303, and the message sentiment 233.

A frequency score 307 may be calculated for each sender of a message 131. In one embodiment, the frequency score FS 307 is calculated using Equation 1, where MF is the message frequency 303 and k is a nonzero constant.

$$FS = k\sqrt{MF} \qquad \text{Equation 1}$$

A notification urgency 231 is calculated for each message 131. The notification urgency 231 may be a function of the message frequency 303, the sender relationship 219, the message sentiment 233, the relationship score 305, and the frequency score 307. The notification 309 may be based on the notification urgency 231 as shown in FIG. 3D.

Figure 3D:
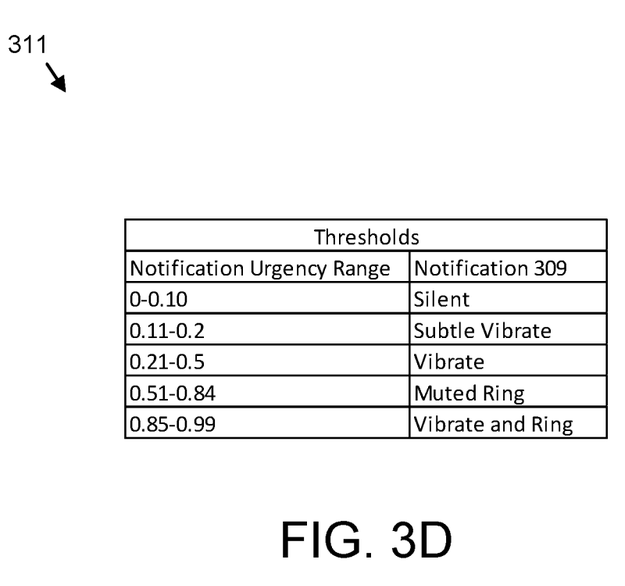
FIG. 3D is a table illustrating one embodiment of threshold data.

FIG. 3D is a table illustrating one embodiment of threshold data 311. The threshold data 311 maybe organized as a data structure in a memory. In the depicted embodiment, the threshold data 311 includes a range of notification urgencies 231. A notification 309 may be selected from the range of notification urgencies 231 based on a notification urgency 231.

Figure 4A:
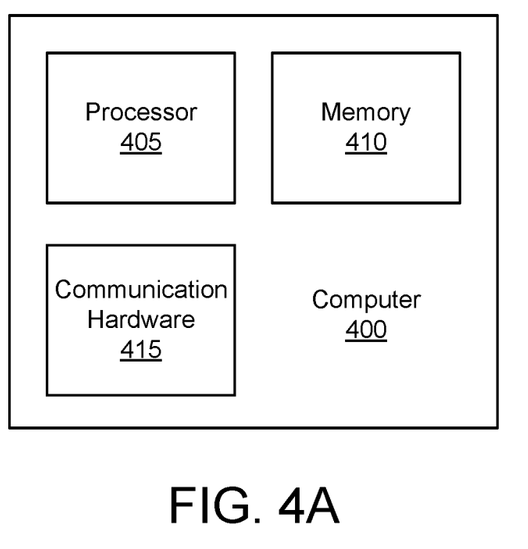
FIG. 4A is a schematic block diagram illustrating one embodiment of a computer.

FIG. 4A is a schematic block diagram illustrating one embodiment of a computer 400. The computer 400 may be embodied in a server 105 and/or the electronic device 110. In the depicted embodiment, the computer 400 includes a processor 405, a memory 410, and communication hardware 415. The memory 410 may include a semiconductor storage device, a hard disk drive, an optical storage device, or combinations thereof. The memory 410 may store code. The processor 405 may execute the code. The communication hardware 415 may communicate with other devices such as the network 115.

Figure 4B:
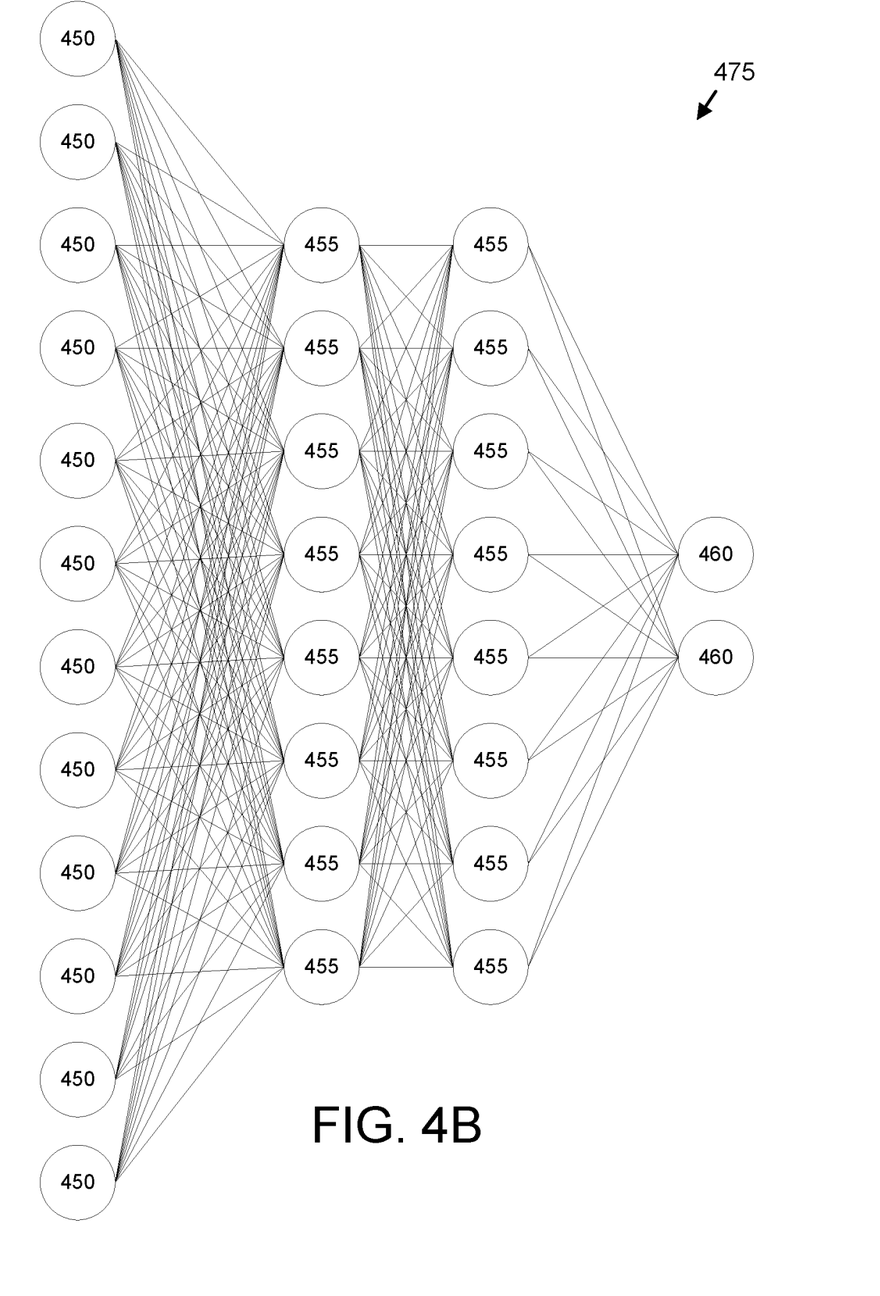
FIG. 4B is a schematic diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, and the like.

The neural network 475 may be trained with training data. The training data may include one or more of sender message data 201, a message frequency 303, a sender relationship 219, a message sentiment 233, a relationship score 305, a frequency score 307, a recipient location 203, location rules 205, a recipient action 207, action rules 209, a timeframe 211, timeframe rules 213, a recipient status 215, status rules 217, sender relationships 219, and/or notification preferences 221. The neural network 475 may be trained using one or more learning functions while applying the training data to the input neurons 450 and known result values for the output neurons 460.

Subsequently, the neural network 465 may receive actual data at the input neurons 450 and make predictions at the output neurons 460 based on the actual data. The actual data may include sender message data 201, a message frequency 303, a sender relationship 219, a message sentiment 233, a relationship score 305, a frequency score 307, a recipient location 203, location rules 205, a recipient action 207, action rules 209, a timeframe 211, timeframe rules 213, a recipient status 215, status rules 217, sender relationships 219, and/or notification preferences 221. The predictions may be the notification urgency 231 for a message 131.

Figure 5A:
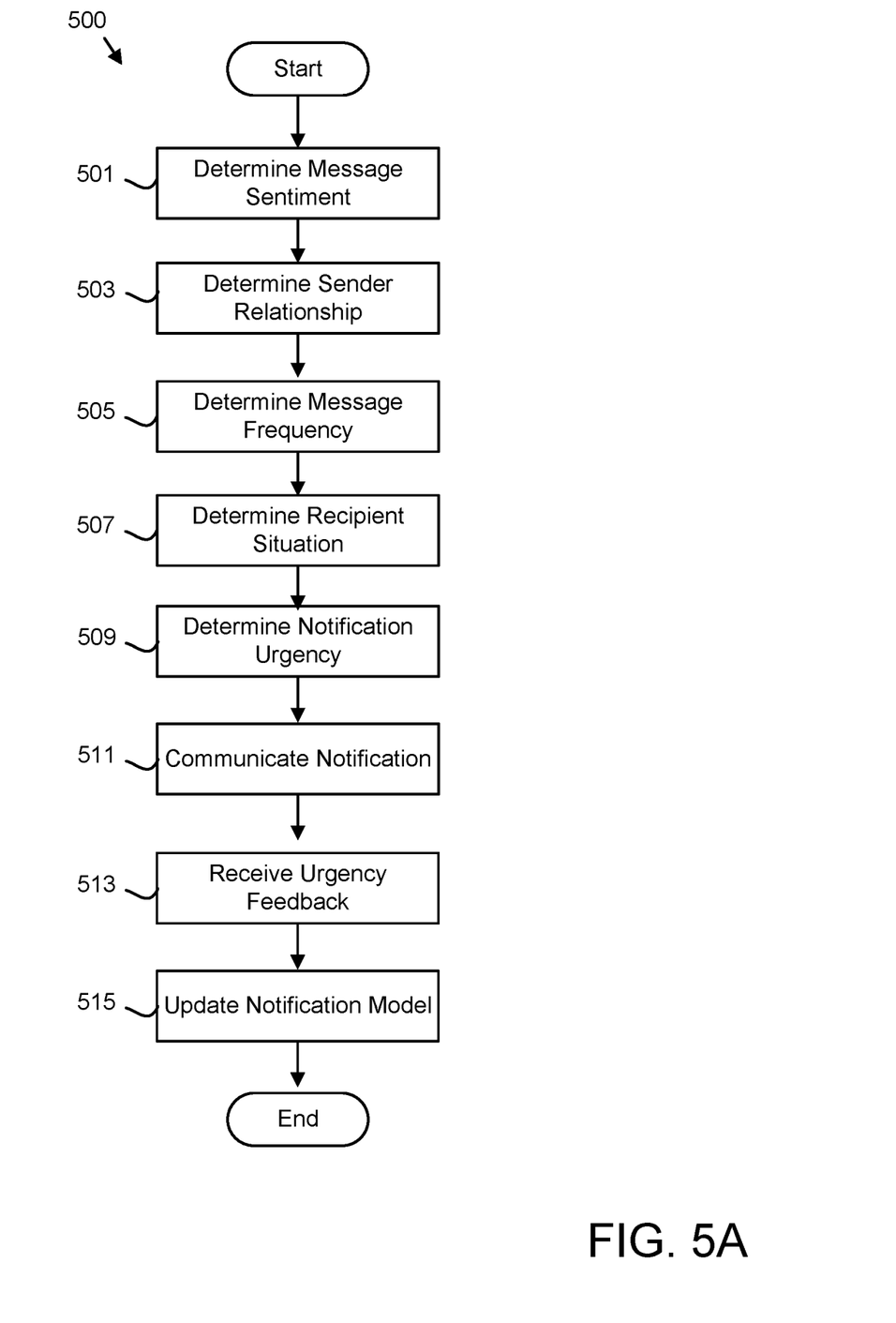
FIG. 5A is a schematic flow chart diagram illustrating one embodiment of an adaptive notification method.

FIG. 5A is a schematic flow chart diagram illustrating one embodiment of an adaptive notification method 500. The method 500 may determine a notification urgency 231 for a message 131 and communicate a notification 309 of the message 131 based on the notification urgency 231. The method 500 may be performed by the processor 405 of the computer 400, the neural network 475, or combinations thereof.

The method 500 starts, and in one embodiment, the processor 405 determines 501 the message sentiment 233 of a message 131. The message 131 may be received by the electronic device 110 and directed to the recipient. In one embodiment, the message 131 is vectorized and analyzed by the processor 405 and/or the neural network 475 to determine 501 the message sentiment 233.

The processor 405 may determine 503 the sender relationship 219 on the sender of the message 131 to the recipient. The sender relationship 219 may be determined from the notification data 200 based on the identity of the sender. In one embodiment, the sender relationship 219 further comprises the relationship score 305.

The processor 405 may determine 505 a message frequency 303 of messages between the sender and the recipient. The message frequency 303 may be a number of messages within a time interval. In addition, the message frequency may comprise the frequency score 307. In one embodiment, the message frequency 303 is calculated using Equation 2, wherein NM is a number of messages 131 received within a specified time interval, NR is a number of reply messages 231 sent to the messages 131, PT is the reply timestamp 237, RT is the receive timestamp 235, and k is a nonzero constant.

$$MF = k(NM + (NR/\text{avg}(PT - RT)))/NM \qquad \text{Equation 2}$$

The processor 405 may determine 507 a recipient situation 227. The recipient situation 227 may be a function of one or more of a recipient location 203, a recipient action 207, a time frame 211, and a recipient status 215.

The processor 405 and/or neural network 475 may determine 509 the notification urgency 231 for the message 131 to the recipient based on the notification model 223. In one embodiment, the notification model 223 scores the message sentiment 233 and the sender relationship 219 and calculates the notification urgency as a function of the message sentiment 233 and the sender relationship 219. The notification model 223 may also be based on the message frequency 303. The notification model 223 may be further based on the recipient situation 227.

In addition, the processor 405 may employ a notification model 223 that is the neural network 475 recursively trained with the message sentiment 233, the sender relationship 219, and the urgency feedback 233. The neural network 475 of the notification model 223 may also be based on the message frequency 303. The neural network 475 of the notification model 223 may be further trained with the recipient situation 227.

The processor 405 may communicate 511 the notification 309 based on the notification urgency 231. In one embodiment, the notification 309 is selected based on their notification urgency 231 as shown in FIG. 3D.

The processor 405 may receive 513 urgency feedback 133 in response to the recipient viewing the message 131 as illustrated in FIG. 2B. The urgency feedback 133 may be recorded with the sender message data 201 for the message 131.

In one embodiment, the processor 405 updates 515 the notification model 223 based on the urgency feedback 133 and the method 500 ends. For example, the processor 405 may retrain the neural network 475 using the notification urgency 231 indicated by the urgency feedback 133 along with the associated message 131 to train the neural network 475. The neural network 475 may be recursively trained with the message sentiment 233, the sender relationship 219, and the urgency feedback 233.

Figure 5B:
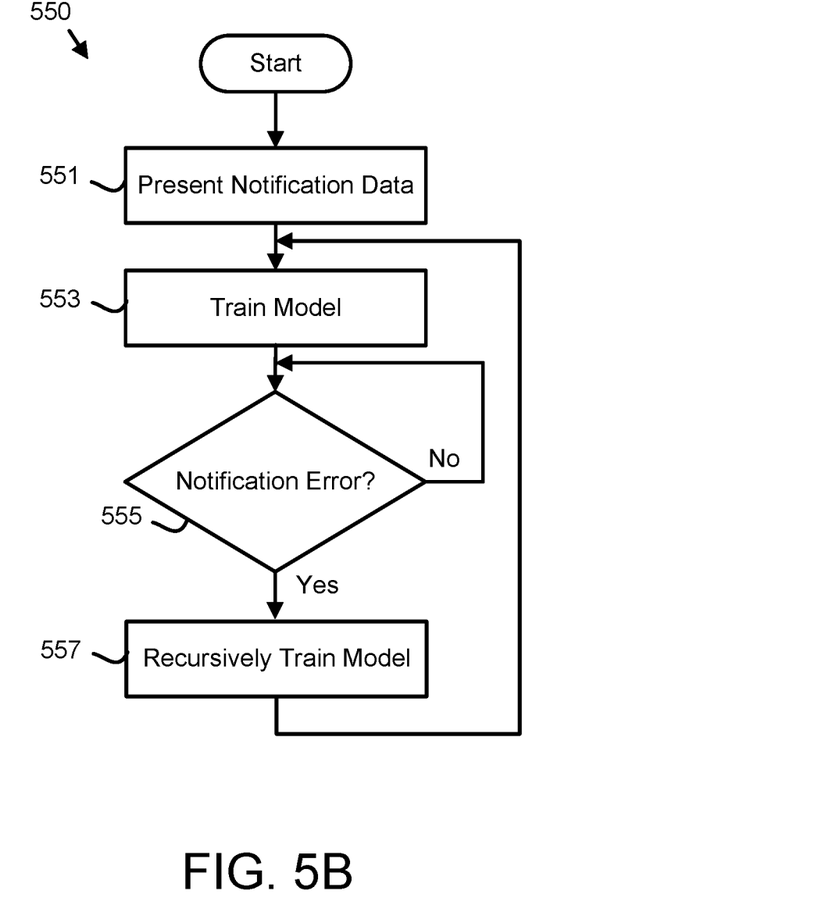
FIG. 5B is a schematic flow chart diagram illustrating one embodiment of a training method.

FIG. 5B is a schematic flow chart diagram illustrating one embodiment of a training method 550. The training method 550 may train the neural network 475 of the notification model 223. The training method 550 may be performed by the processor 405 and/or the neural network 475.

The method 551 starts, and in one embodiment, the processor 405 presents 551 the notification data 200 to the neural network 475. In addition, the processor 405 may present notification urgencies 231 associated with the notification data 200 to the neural network 475. The processor 405 may further train 553 the notification model 223 by applying a learning method to the neural network 475. The learning method may associate the notification data 200 with notification urgencies 231.

In one embodiment, the processor 405 determines 555 a notification error. The notification error may be urgency feedback 133 that indicates more urgency or less urgency was appropriate for a notification 309 of a message 131. If no notification error is determined 555, the processor 405 loops to determine 555 the notification error. In response to determining 555 the notification error, the processor 405 may retrain 553 the neural network 475 of the notification model 223 using the notification urgency 231 indicated by the urgency feedback 133 along with the associated message 131 and the method 550 ends.

Figure 5C:
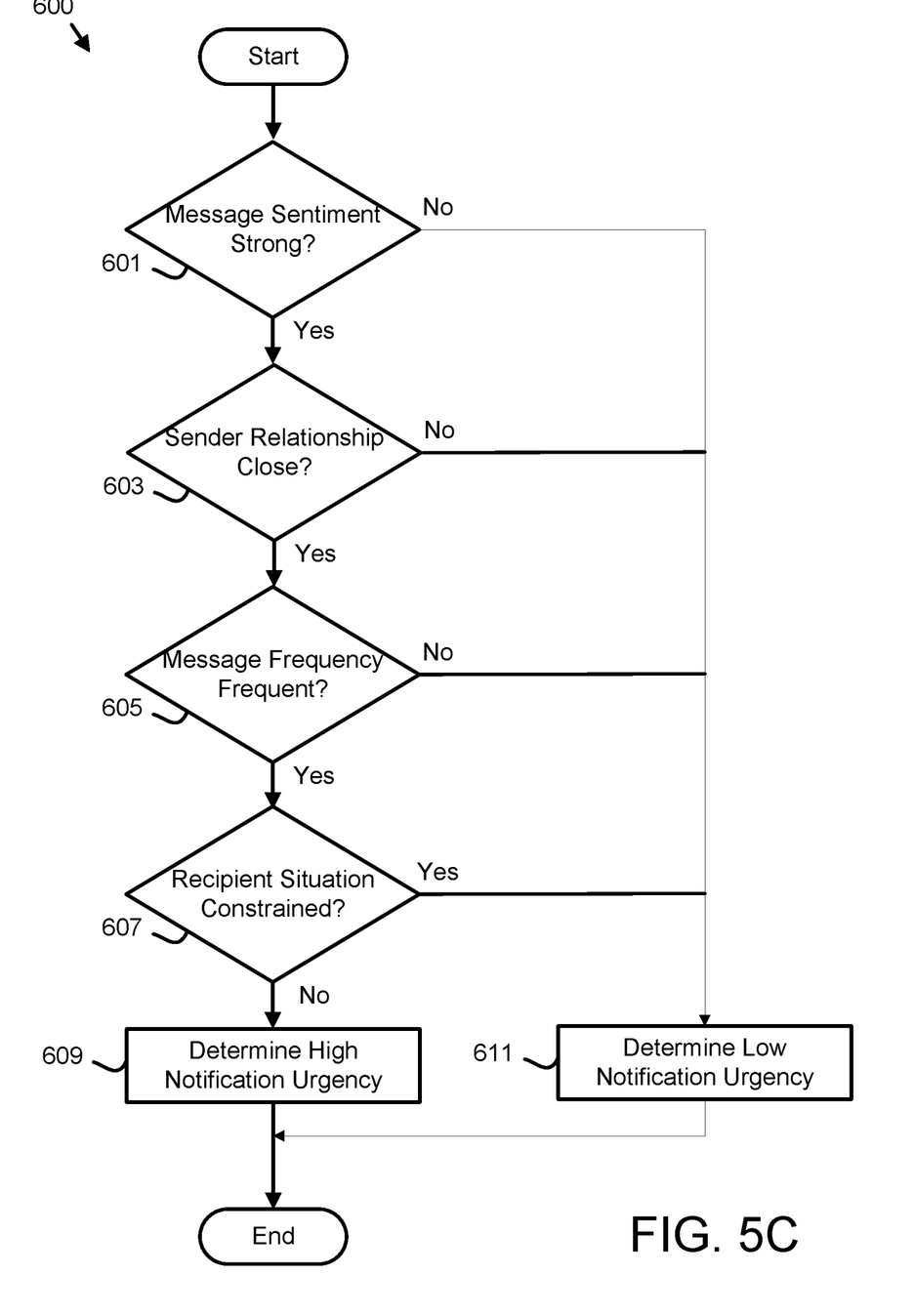
FIG. 5C is a schematic flow chart diagram illustrating one embodiment of a notification urgency determination method.

FIG. 5C is a schematic flow chart diagram illustrating one embodiment of a notification urgency determination method 600. The method 600 may determine one of the high notification urgency 231 and a low notification urgency 231. The method 600 may be performed by the processor 405 and/or the neural network 475.

The method 600 starts, and in one embodiment, the processor 405 determines 601 if the message sentiment 233 is strong. In one embodiment, the message sentiment 233 is strong if the message sentiment 233 exceeds the sentiment threshold. If the message sentiment 233 is not strong, the processor 405 may determine 611 low notification urgency 231 and the method 600 ends. A low notification urgency 231 may be 0.08. In one embodiment, a low notification urgency 231 is less than 0.85.

If the message sentiment 233 is strong, the processor 405 may determine 603 if the sender relationship 219 is close. The sender relationship 219 may be close if the relationship score 305 exceeds a relationship threshold. If the sender relationship 219 is not close, the processor 405 may determine 611 low notification urgency 231.

If the sender relationship 219 is close, the processor 405 may determine 605 if the message frequency 303 is frequent. The message frequency 303 may be frequent if the message frequency 303 exceeds a frequency threshold. If the message frequency 303 is not frequent, the processor 405 may determine 611 low notification urgency 231.

If the message frequency 303 is frequent, the processor 405 may determine if the recipient situation 227 is constrained. The recipient situation 227 may be constrained if one or more of the recipient location 203 satisfies the location rules 205, the recipient action 207 satisfies the action rules 209, the time frame 211 satisfies the time frame rules 213, and the recipient status 215 satisfies the status rules 217. If the recipient situation 227 is constrained, the processor 405 may determine 611 low notification urgency 231.

If the recipient situation 227 is not constrained, the processor 405 may determine high notification urgency 231 and the method 600 ends. In one embodiment, a high notification urgency 231 is greater than or equal to 0.85. Alternatively, the high notification urgency 231 may be greater than 0.10.

The embodiments determine the notification urgency 231 for the message 131 from the notification model 223. The notification urgency 231 derived from the notification model 223 may be based on the message sentiment 233 and the sender relationship 219. The embodiments further communicate a notification 309 of the message 131 based on the notification urgency 231. As a result, the notification urgency 231 of the notification 309 more closely approximates the urgency of the message 131 to the recipient, improving communication with the recipient. Thus, the recipient knows which messages 131 to view immediately and which messages 131 to defer until later with greater accuracy, improving the timeliness and value of the messages 131, and the operation of the computer 400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
determine a message sentiment of a message;
determine a sender relationship of a sender of the message to a recipient based on a message frequency MF calculated as MF=k(NM+(NR/avg(PT-RT)))/NM, wherein NM is a number of messages, NR is a number of reply messages, PT is a reply timestamp, RT is a receive timestamp, and k is a nonzero constant;

determine a frequency score FS calculated as $FS=k\sqrt{MF}$, wherein MF is the message frequency;

determine a notification urgency for the message to the recipient based on a notification model based on the message sentiment the frequency score, and the sender relationship; and communicate a notification of the message to the recipient based on the notification urgency.

2. The apparatus of claim 1, wherein the notification model is a neural network recursively trained with the message sentiment, the sender relationship, and an urgency feedback.

3. The apparatus of claim 1, wherein the notification model scores the message sentiment and the sender relationship and calculates the notification urgency as a function of the message sentiment and the sender relationship.

4. The apparatus of claim 1, wherein the notification urgency specifies one or more of an alert volume, an alert tone, an alert tune, an alert duration, a vibration intensity, and a vibration duration.

5. The apparatus of claim 1, wherein the message frequency is further calculated as a function of messages between the sender and the recipient.

6. The apparatus of claim 1, wherein the code is further executable by the processor to determine a recipient situation, wherein the notification model is further based on the recipient situation.

7. The apparatus of claim 6, wherein the recipient situation comprises one or more of a recipient location, a recipient action, a time frame, and a recipient status.

8. A method comprising:

determining, by use of a processor, a message sentiment of a message;

determining a sender relationship of a sender of the message to a recipient based on a message frequency MF calculated as $MF=k(NM+(NR/avg(PT-RT)))/NM$, wherein NM is a number of messages, NR is a number of reply messages, PT is a reply timestamp, RT is a receive timestamp, and k is a nonzero constant;

determining a frequency score FS calculated as $FS=k\sqrt{MF}$, wherein MF is the message frequency;

determining a notification urgency for the message to the recipient based on a notification model based on the message sentiment, the frequency score, and the sender relationship; and communicating a notification of the message to the recipient based on the notification urgency.

9. The method of claim 8, wherein the notification model is a neural network recursively trained with the message sentiment, the sender relationship, and an urgency feedback.

10. The method of claim 8, wherein the notification model scores the message sentiment and the sender relationship and calculates the notification urgency as a function of the message sentiment and the sender relationship.

11. The method of claim 8, wherein the notification urgency specifies one or more of an alert volume, an alert tone, an alert tune, an alert duration, a vibration intensity, and a vibration duration.

12. The method of claim 8, wherein the message frequency is further calculated as a function of messages between the sender and the recipient.

13. The method of claim 8, the method further comprising determining a recipient situation, wherein the notification model is further based on the recipient situation.

14. The method of claim 13, wherein the recipient situation comprises one or more of a recipient location, a recipient action, a time frame, and a recipient status.

15. A program product comprising a non-transitory computer readable storage medium that stores code executable by a processor, the executable code comprising code to:

determine a message sentiment of a message;

determine a sender relationship of a sender of the message to a recipient based on a message frequency MF calculated as $MF=k(NM+(NR/avg)PT-RT))/NM$, wherein NM is a number of messages, NR is a number of reply messages, PT is a reply timestamp, RT is a receive timestamp, and k is a nonzero constant;

determine a frequency score FS calculated as $FS=k\sqrt{MF}$, wherein MF is the message frequency;

determine a notification urgency for the message to the recipient based on a notification model based on the message sentiment, the frequency score, and the sender relationship; and communicate a notification of the message to the recipient based on the notification urgency.

16. The program product of claim 15, wherein the notification model is a neural network recursively trained with the message sentiment, the sender relationship, and an urgency feedback.

17. The program product of claim 15, wherein the notification model scores the message sentiment and the sender relationship and calculates the notification urgency as a function of the message sentiment and the sender relationship.

18. The program product of claim 15, wherein the notification urgency specifies one or more of an alert volume, an alert tone, an alert tune, an alert duration, a vibration intensity, and a vibration duration.

19. The program product of claim 15, wherein the message frequency is further calculated as a function of messages between the sender and the recipient.

20. The program product of claim 15, wherein the code is further executable by the processor to determine a recipient situation, wherein the notification model is further based on the recipient situation.

* * * * *